(No Model.)　　　　　　　　　　　　　　　　　　　　　　　4 Sheets—Sheet 1.
H. MILLER.
SOLDERING MACHINE.
No. 531,419.　　　　　　　　　　　　　　　　Patented Dec. 25, 1894.
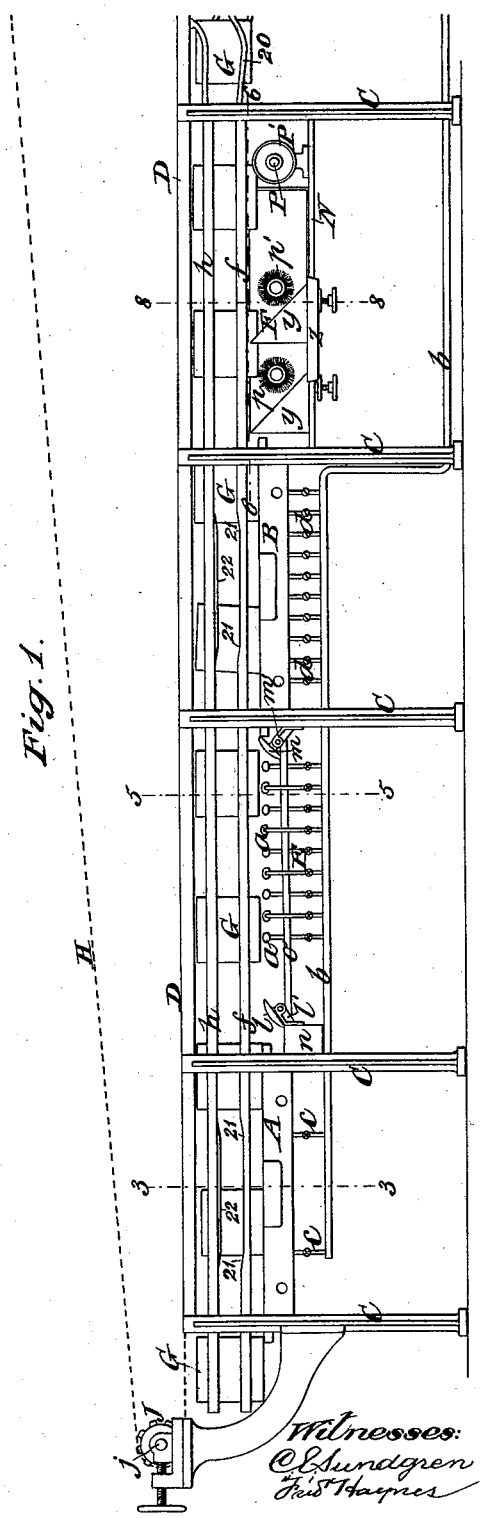
Fig. 1.
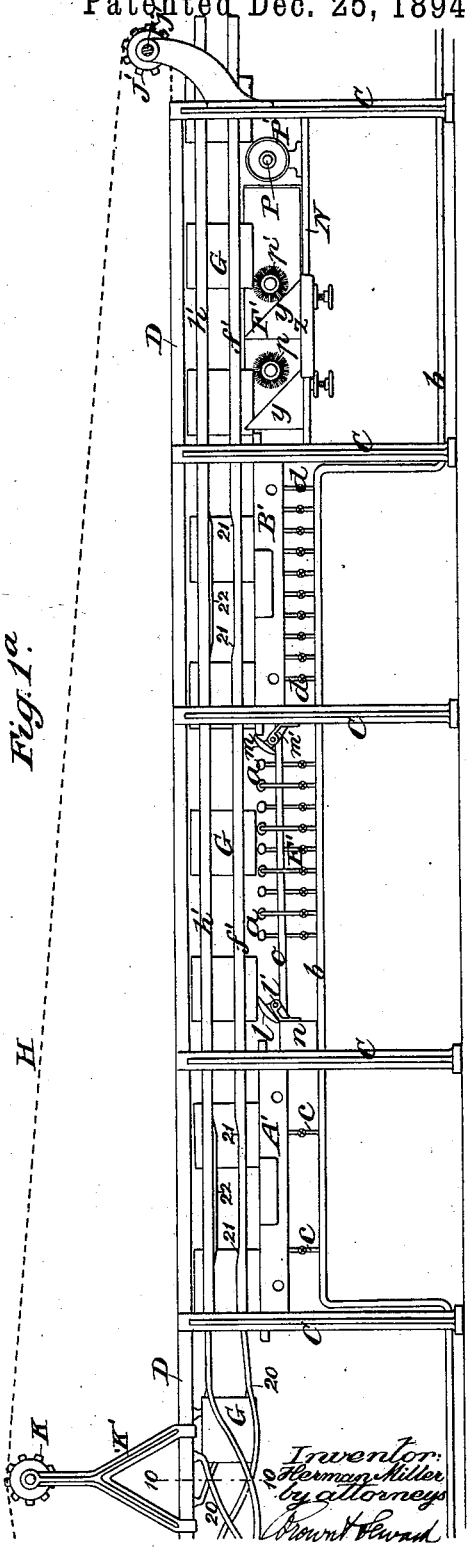
Fig. 1ª.
Witnesses:
C. E. Sundgren
Fred Haynes
Inventor:
Herman Miller
by attorneys
Brown & Seward

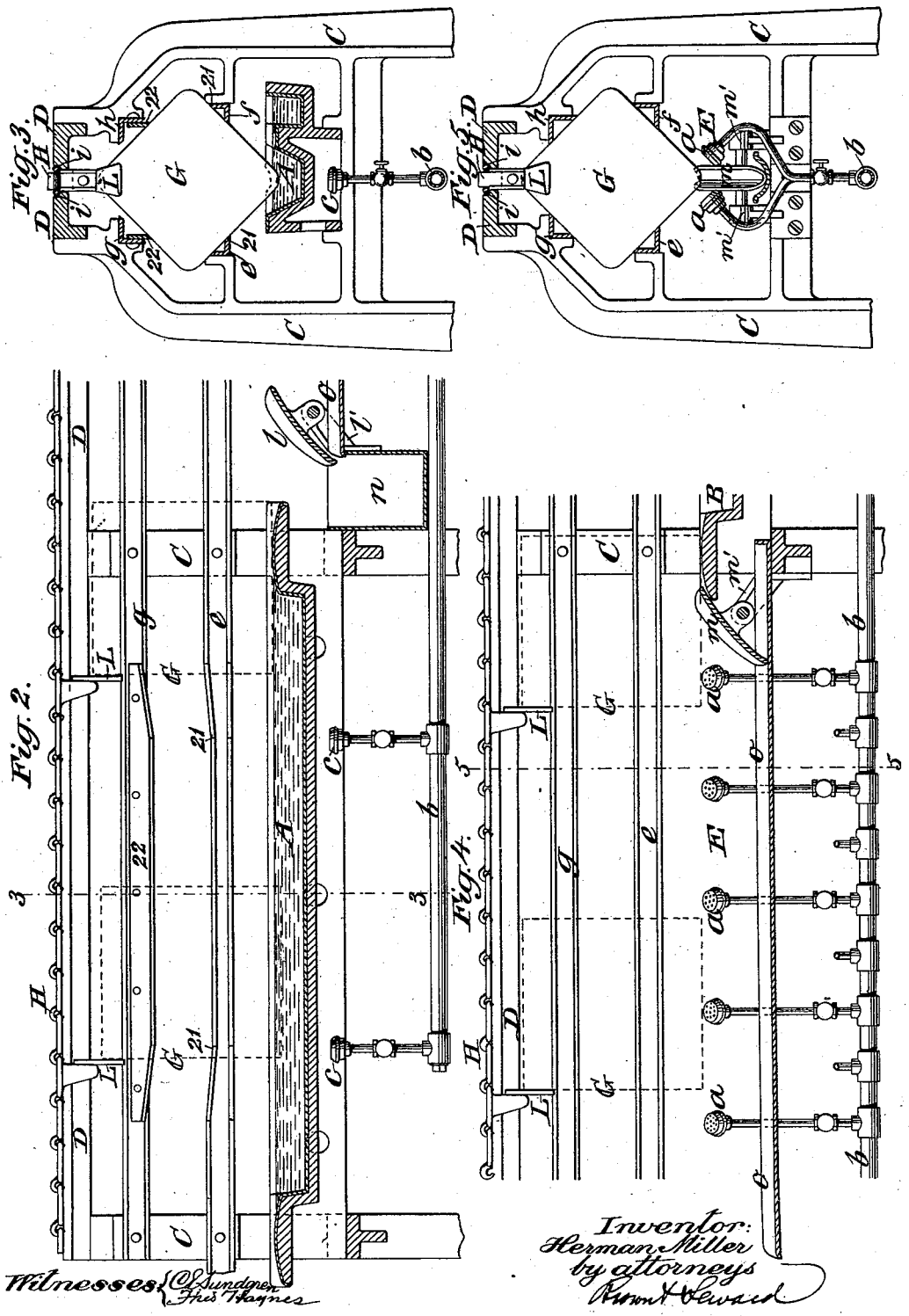

(No Model.) 4 Sheets—Sheet 3.
H. MILLER.
SOLDERING MACHINE.
No. 531,419. Patented Dec. 25, 1894.
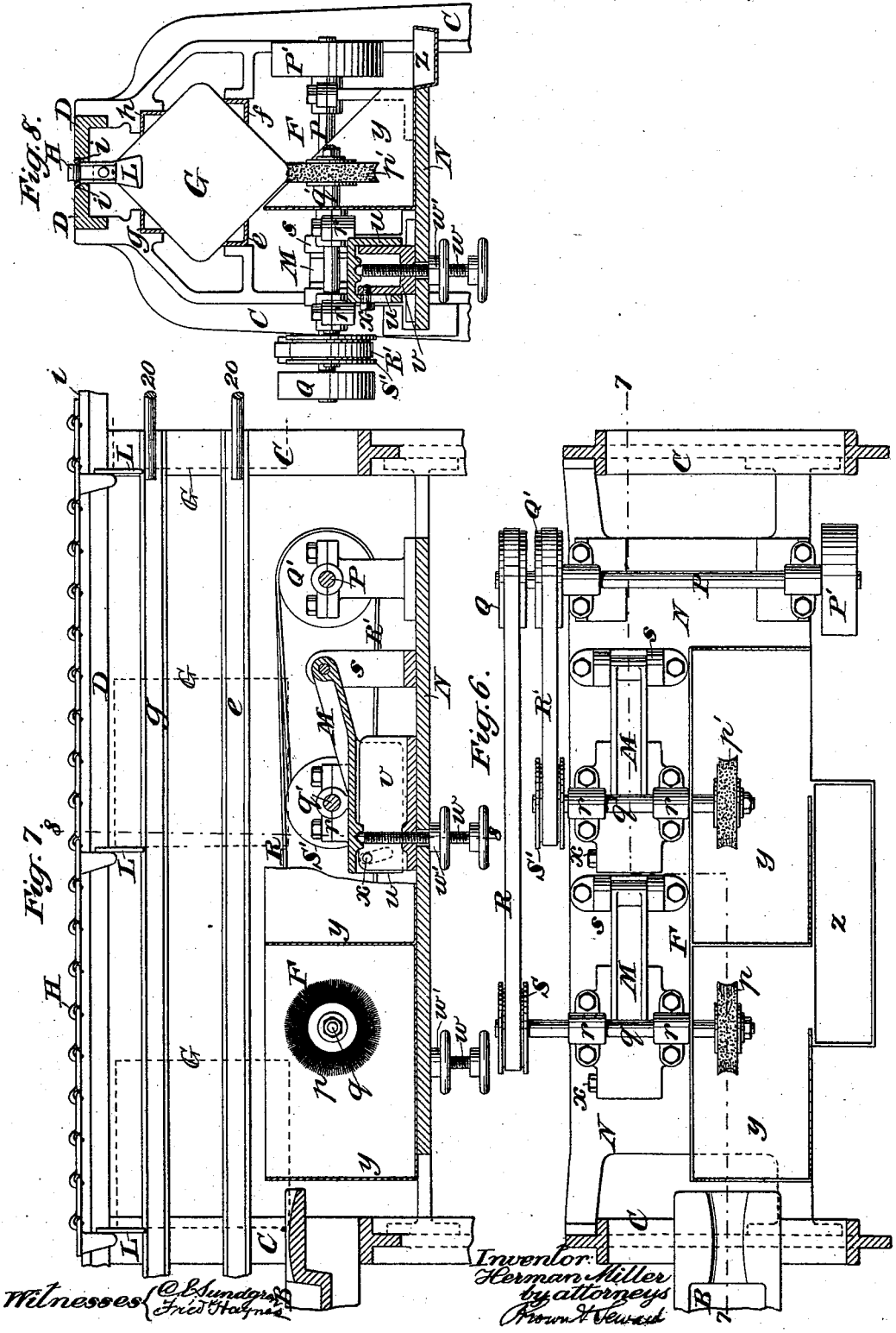

(No Model.) 4 Sheets—Sheet 4.
H. MILLER.
SOLDERING MACHINE.
No. 531,419. Patented Dec. 25, 1894.
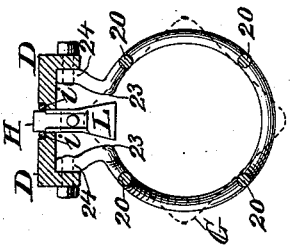
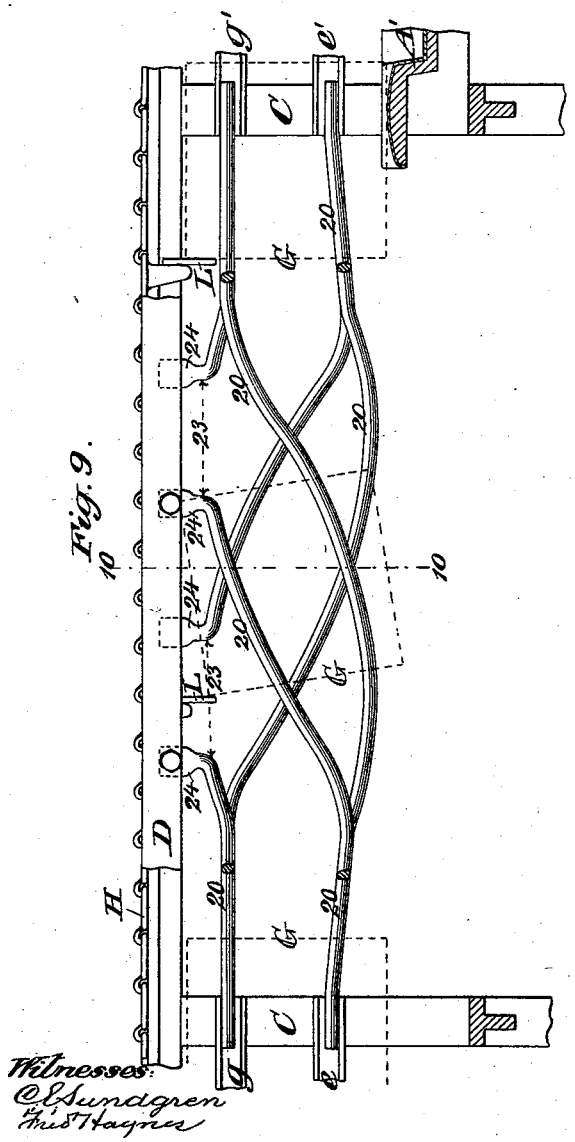
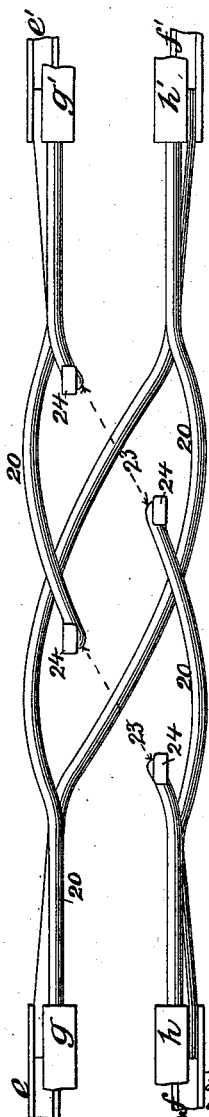
Witnesses:
Inventor
Herman Miller
by attorney
THE NORRIS PETERS CO., PHOTO-LITHO., WASHINGTON, D. C.

UNITED STATES PATENT OFFICE.

HERMAN MILLER, OF NEW YORK, N. Y.

SOLDERING-MACHINE.

SPECIFICATION forming part of Letters Patent No. 531,419, dated December 25, 1894.

Application filed May 15, 1894. Serial No. 511,383. (No model.)

*To all whom it may concern:*

Be it known that I, HERMAN MILLER, of the city and county of New York, in the State of New York, have invented a new and useful Improvement in Soldering-Machines, of which the following is a specification.

This invention relates to apparatus for soldering seams formed along the corners at the junction of the adjacent sides of a square or polygonal can, the soldering being performed by causing the said seams to run over and be dipped into vessels containing melted solder.

In an apparatus embodying my invention the can makes a straight run during which first one and then another of its side corners are each in succession subjected to four operations, viz: first, dipped into an acid bath; second, passed over a fire; third, dipped into a bath of melted solder, and fourth, subjected to a brushing operation for the removal of superfluous solder and any impurity of the solder that may have adhered to it.

I will now proceed to describe my apparatus in detail with reference to the accompanying drawings and afterward point out its novelty in claims.

Figures 1 and 1$^a$ represent together a full length elevation of the principal parts of a machine embodying my invention, each figure representing a portion of the length of the machine. Fig. 2 represents on a larger scale than Fig. 1, vertical sections taken parallel with Fig. 1, of that part of the machine wherein one of the acid baths is located. Fig. 3 represents a transverse vertical section taken in the line 3, 3, of Figs. 1 and 2. Fig. 4 represents a longitudinal vertical section of that part of the machine wherein one of the fires is located. Fig. 5 represents a transverse section in the line 5, 5, of Figs. 1 and 4. Fig. 6 represents a horizontal section taken in the line 6, 6, of Fig. 1, and showing one set of the brushes for the removal of superfluous solder. Fig. 7 represents a vertical section taken in the line 7, 7, of Fig. 6. Fig. 8 represents a transverse section taken in the line 8, 8, of Figs. 1 and 7. Fig. 9 is a longitudinal vertical sectional view of that part of the machine wherein after the soldering and finishing of one seam, the can is turned to present another seam in position for dipping and soldering. Fig. 10 represents a transverse vertical section in the line 10, 10 of Figs. 1$^a$ and 9. Fig. 11 is a plan view corresponding with Fig. 9. Fig. 12 represents a section of a side corner seam of a can for the soldering of which my apparatus is adapted. Figs. 2 to 11 are on the same scale larger than Figs. 1 and 1$^a$, and Fig. 12 is on a still larger scale.

Similar letters and numerals of reference designate corresponding parts in all the figures.

The particular example of my invention which I have selected for illustration is for soldering the side corner seams of square cans, the bodies or sides of which are composed of two plates each bent at a right angle to form two sides and one corner of the body, such cans having two side seams one in each of two opposite side corners and therefore the machine consists of two divisions in one of which one seam and in the other of which the other seam is soldered, a driving chain which moves the cans through the successive stages of their operation being common to both divisions. The first of these divisions in which the first seam is soldered is shown in Fig. 1, and the second in Fig. 1$^a$. In each division there is a vessel A or A' for containing flux and a vessel B or B' for containing molten solder, and there is between each flux vessel and its respective solder vessel a heating apparatus E or E'; and there is also beyond each solder vessel a brushing apparatus F or F' for brushing off the superfluous solder and any impurities that may remain on the seam after soldering. The said two flux vessels and two solder vessels, two heating apparatuses and two brushing apparatuses are all arranged in alignment with each other in a framing which consists of standards C connected by longitudinal stringers D D which extend the whole length of the apparatus. The first flux vessel A is arranged as shown in Fig. 1, near one end of the apparatus, viz: that end at which the cans are introduced. The first solder vessel B is arranged sufficiently distant from the said vessel A to make room between them for their respective heating apparatus E which consists of a series of gas burners $a$ (see Figs. 4 and 5) for the purpose of heating the seams of the cans after leaving the acid bath in the vessel A and before entering the solder bath in the vessel B, the said burners $a$ being supplied by a gas pipe $b$ which also supplies a series of burners $c$ for warming the acid in the vessel A and another series $d$ for heating and keeping melted the solder in the vessel B. The said framing C D also supports the track along which the can bodies G are moved over the flux and solder vessels and the heating and brushing apparatus by the endless driving chain H. This track which runs the whole length of the apparatus, consists in the first division of the machine, of four straight rails $e f g$ and $h$, represented as severally made of angle-iron. The two lower rails $e$ and $f$ are both supporting rails and guide rails upon which the can bodies severally run with one of their side corner seams projecting downward through the open space between the said two rails as shown in Figs. 3, 5 and 8. The two upper rails $g$ and $h$ are merely guide rails. The flux vessels and solder vessels and the intermediate heating apparatus and the brushing apparatus are arranged in alignment with the track directly under the opening between the lower track rails.

In the second division of the machine the track consists of four similar straight rails $e'$ $f'$ $g'$ $h'$ arranged in alignment respectively with $e f g h$ and the flux and solder vessels A' B' and heating apparatus E' and brushing apparatus F' of this division are arranged in the same relation to each other in alignment with the track. The two upper rails $g$ and $h$ of the first division are connected with or made to lead to the two lower ones $e' f'$ of the second division and the two lower rails $e f$ of the first division are connected with or made to lead to the two upper ones of the second division by intermediate junction rails 20, represented as of round iron, said junction rails being so curved spirally that they conform to half turns of the threads of a four-threaded straight screw the axis of which is parallel with and central to the width of the two straight track divisions and that a can body in being moved uninterruptedly by the driving chain H from one division of the apparatus to the other will, without swerving from its straight course, be simply turned about its own longitudinal axis to the extent of half a revolution while the said axis remains in alignment with the track. The lower rails $e$ $f$ and $e' f'$ have their upper and inner edges upon which the can bodies G are supported so cut away or reduced as shown at 21 (see Figs. 1, 1ª, 2, and 3) to produce depressions over their successive flux vessels and solder vessels that as the can bodies run along them they will drop a short distance to dip themselves into the flux and solder in the said vessels and afterward lift themselves out of the flux and solder. Above the depressions indicated by 21 in the lower rails $e f$ and $e'$ $f'$ there are strips or cheek plates 22 bolted or riveted to the angle irons of the rails as shown in Figs. 1, 1ª, 2 and 3 and projecting below the lower edges of the angle-irons to produce depressions corresponding with those indicated by 21 in the lower rails for the purpose of insuring the dipping of the cans. By thus cutting away the edges of the lower rails and adding strips or cheek-plates to the upper ones, the depression of the rails over the flux and solder vessels is produced in a simpler and less expensive way than by bending the rails.

The endless chain H runs the whole length of the apparatus, sprocket wheels J J' and shafts $j j'$ for the same being provided for said chain at each end of the apparatus. The shaft $j$ of the sprocket wheel J' is supposed to be the driving shaft of the chain. The upper run of the chain is supported at about the middle of its length by an idler wheel K, the shaft of which runs in bearings in standards K' erected on the main framing. The lower run of the said chain is kept horizontal and exactly over the center of the track in guide grooves $i$ provided for it in the inner stringers D, as shown in Figs. 3, 8 and 10. The space between the two stringers is just sufficient for the passage of the pushers L L which are provided on the chain at intervals somewhat greater than the length of the can bodies, the said pushers projecting downward far enough to act against the can bodies which are in the track. In order that the pushers may pass the spiral junction rails 20, the said rails are interrupted in their upper parts which are nearest the chain to form openings 23. The interrupted ends between which these openings are produced, are formed with up-turned lugs 24, which are bolted to the stringers D to give stability to this part of the track.

Just beyond each of the flux vessels A A', a metallic scraper or wiper $l$ (Figs. 1, 1ª, and 2) is pivoted to a stationary bracket $l'$ so as to be capable of swinging in the direction in which the cans are moved. This scraper or wiper consists of a plate of metal having its upper face of concave or trough-like transverse section corresponding substantially with the transverse section of the side corners of the can body but its inner or upper face is made slightly convex longitudinally. The said scraper or wiper is so balanced on its pivot that the end next the flux-containing vessel will tend to drop and it is arranged at such a level that the corner of the can as the latter leaves the said vessel will be drawn into contact with the said scraper or wiper and that the latter will by its movement on the pivot adapt itself to the corner for the purpose of scraping or wiping off some of the superfluous flux which may remain on it after leaving the vessel A or A'. The longitudinal convex form of the scraper or wiper prevents its ends from presenting any obstruction to the can and insures the better adaptation of some part of its length to the corner of the body. Under that rear end of this metallic scraper or wiper $l$ next the flux vessel there is a stationary waste trough $n$ for the collection of any acid which may be received on the said scraper or wiper from the can body. Beyond each heating apparatus E E' and immediately behind the corresponding solder vessel B or B', there is a similar metallic scraper or wiper $m$ (see Figs. 1, 1ª, 4 and 5) pivoted to a stationary bracket $m'$ for the purpose of removing from the corner of the can body any superfluous flux that may still remain thereon after the can body has passed the heating apparatus. Below this scraper or wiper $m$ there is a trough $o$ which runs back to the waste vessel $n$ for conducting thereto any of the flux that may be removed by the said scraper or wiper $m$. The metallic scrapers or wipers $l\ m$ by reason of their form and their pivotal arrangement adapt themselves easily to the corners of the can bodies in their passage over them and are not liable to scratch or injure the can bodies as fixed metallic scrapers or wipers would do.

The brushing apparatuses F F' (see Figs. 1, 1ª, 6, 7, and 8) each include two rotary brushes $p\ p'$, the shafts $q\ q'$ of which are arranged transversely to the track in suitable bearings $r$ in frames M which are pivoted to standards $s$ erected on plates N supported on the standards C, the said brushes being situated directly under the center of the track and their peripheries being of such transverse profile as to conform to the corners of the can body. The pivoted frames M on which are the bearings for the brush shafts $q\ q'$ have at their sides downwardly projecting cheeks $u$ which overlap, as shown in Fig. 8, the sides of stands $v$ supported on the plates N. For the purpose of properly adjusting the brushes to the seams of the can body in the track, adjusting screws $w$ are applied under the frames M, through openings in the said plates N, the said screws screwing through tapped holes in the bottoms of the stands $v$ and passing freely through said plates. The said screws are fitted under the plates N with nuts $w'$ for the purpose of securing the vertical adjustment of the screws. For the further securing of the adjustment of the brushes a set screw $x$ passes through one of the cheeks $u$ of each frame M and screws into one side of its respective stand $v$. Under each brush $p\ p'$ is a waste box $y$ and these waste boxes communicate with a waste receptacle $z$ at one side of the machine for the reception of the matter which is brushed off from the seam by the brushes $p\ p'$. The brushes are represented as driven from a shaft P which is arranged parallel with the brush shafts $q$, $q'$ in suitable fixed bearings on the framing and it is furnished at one end with a driving pulley P' through which it receives motion from any suitable source of power and at the other end with two pulleys Q Q' from which belts R R' run respectively over pulleys S S' on the brush shafts.

The gas burners $a$ for heating the seams of the can bodies before the dipping in the solder in the vessels B B' are so arranged (see Fig. 5) on branches of the gas pipe $b$ that their flames will impinge directly upon the can body on opposite sides of the seam, one-half of the burners in the series being arranged on one side and the other half on the other side of the center line of the track. This arrangement of burners for the purpose of heating the seams and adjacent portions of the can body before dipping into the solder is found to be very important for the purpose of preventing the buckling of the sides of the can body which results from the sudden expansion produced by plunging the seam directly in the solder without the preparatory heating of the adjacent parts of the sides, such expansion being sometimes sufficient to break the same before it can be properly soldered. This liability to buckling is especially great with round-cornered can bodies.

Having described all the details of the machine I will describe briefly the operation of soldering the can bodies therein, first explaining that before the can bodies are brought to this machine the plates forming the sides of the can body are assembled together and the corner seams closed and that I generally prefer also to insert and solder in the heads in order to maintain the bodies in proper shape during the operation of this machine.

The flux vessels having been supplied with flux, the solder vessels having been supplied with solder, all the gas burners having been lighted and the solder having been melted, rotary motion is given to the main driving shaft and to the brush driving shaft. The cans having had their parts properly assembled and being placed by an attendant one at a time in the track through an opening at one side thereof at that end of the machine represented at the left hand of Fig. 1, are carried forward along the track by the pushers of the chain through the first division of the machine shown in Fig. 1 with the first seam to be soldered presented downward between the lower rails $e\ f$ of the track and being thus carried forward are first dipped into the flux in the first vessel A, then subjected to the action of the pivoted metallic scraper or wiper $l$ to remove some of the superfluous flux; next heated along and at the sides of their seams by the first heating apparatus, then subjected to the second scraping or wiping operation by the pivoted metallic scraper or wiper $m$, afterward dipped into the solder vessel B to be soldered and finally subjected to the action of the brushing apparatus. One seam having thus been soldered, the can bodies pass through the intermediate portion of the track formed by the spirally arranged junction rails 20, and as they pass through this portion of the track are turned about their longitudinal axes to the extent of a half revolution without swerving either to the right or to the left, thus presenting downward between the lower rails $e' f'$ of the track the opposite corner seam of the can body to that which was soldered in the first division of the machine. The bodies are then carried forward through the second division of the machine in which the seam now presented downward is subjected to operations similar to those to which the seam now presented upward was subjected in the first division, viz: first dipping into the flux in the vessel A', next scraping or wiping off a portion of the superfluous flux by the scraper or wiper $l$, then heating by the heating apparatus E', next further scraping or wiping off the superfluous flux by the scraper or wiper $m$, then dipping into the solder in the vessel B', and finally brushing by the brushing apparatus F'. The cans having had both their side corner seams soldered are delivered at that end of the machine which is shown at the right hand of Fig. 1ª.

What I claim as my invention is—

1. In a can soldering machine, the combination of two solder vessels in direct alignment with each other, two straight track divisions directly in alignment with each other over the said vessels, and junction rails in the form of threads of a straight screw the axis of which is parallel with and central to the width of both of the said straight track divisions, the said rails connecting the said straight track divisions, and means of moving the can bodies along said straight track divisions and junction rails, substantially as herein set forth.

2. In a can soldering machine, the combination of two solder vessels in alignment with each other, a track composed of two straight divisions which are directly in alignment with each other and an intermediate division consisting of rails in the form of threads of a straight screw the axis of which is parallel with and central to the width of said straight division, and an endless chain arranged above said track and furnished with pushers for pushing the can bodies along said track, the latter rails being interrupted in the upper part of the track for the passage of the pushers, substantially as herein set forth.

3. In a can soldering machine, the combination with rails for supporting a series of can bodies and means of moving the same along said rails, of one or more metallic scrapers or wipers consisting of plates having their upper surfaces concave transversely and convex longitudinally and pivoted under the said rails, substantially as and for the purpose herein set forth.

4. In a can soldering machine, the combination with a vessel for containing solder or flux and an endless chain for moving can bodies over such vessel, of a track composed of upper and lower angle-iron rails in the lower of which rails depressions are produced over said vessel by the reduction of their edges and in the upper of which rails corresponding depressions are produced by the addition of cheek plates, substantially as herein set forth.

5. In a can soldering machine, the combination with rails for supporting can bodies with their seams exposed through an open space between said rails and means of moving the can bodies along said rails, of rotary brushes arranged below said space and means of adjusting the said brushes toward and from said open space, substantially as herein set forth.

HERMAN MILLER.

Witnesses:
FREDK. HAYNES,
IRENE B. DECKER.